United States Patent [19]

Vanel

[11] Patent Number: 5,852,099

[45] Date of Patent: *Dec. 22, 1998

[54] RUBBER COMPOSITION FOR THE MANUFACTURE OF TIRES WHICH HAS A BASE OF PRECIPITATED SILICAS "DOPED" WITH ALUMINUM

[75] Inventor: Robert Vanel, Clermont-Ferrand, France

[73] Assignee: Compagnie Generale des Etablissements Michelin—Michelin & Cie, Clermont-Ferrand Cedex, France

[ * ] Notice: This patent issued on a continued prosecution application filed under 37 CFR 1.53(d), and is subject to the twenty year patent term provisions of 35 U.S.C. 154(a)(2).

[21] Appl. No.: 611,244

[22] Filed: Mar. 5, 1996

[30] Foreign Application Priority Data

Mar. 29, 1995 [FR] France ................................. 95 04077

[51] Int. Cl.$^6$ ............................. C08K 3/36; C08K 3/34
[52] U.S. Cl. ......................... 524/494; 524/492; 524/493; 524/262; 524/265; 423/339; 523/213; 523/216
[58] Field of Search .................................. 524/494, 492, 524/493, 262, 265; 423/339; 523/213, 216

[56] References Cited

U.S. PATENT DOCUMENTS

| | | | |
|---|---|---|---|
| 3,873,489 | 3/1975 | Thurn et al. | 260/448.2 |
| 4,202,813 | 5/1980 | Wason | 423/339 |
| 4,436,847 | 3/1984 | Wagner et al. | 523/213 |
| 4,517,336 | 5/1985 | Wolff et al. | 524/262 |
| 4,537,699 | 8/1985 | Jas | 423/339 |
| 4,968,728 | 11/1990 | Wason | 523/216 |
| 5,227,425 | 7/1993 | Rauline | 524/493 |

FOREIGN PATENT DOCUMENTS 631982  4/1995  European Pat. Off. .

Primary Examiner—Vasu Jagannathan
Assistant Examiner—Olga Asinovsky
Attorney, Agent, or Firm—Baker & Botts, LLP

[57] ABSTRACT

The object of the present invention is a rubber composition which is intended for the manufacture of tires and has a base of precipitated silicas "doped" with aluminum, the aluminum content being between $\geq 0.35\%$ and $\leq 3\%$ by weight of silica. Said composition has improved working properties as well as improved hysteresis properties.

19 Claims, No Drawings

RUBBER COMPOSITION FOR THE MANUFACTURE OF TIRES WHICH HAS A BASE OF PRECIPITATED SILICAS "DOPED" WITH ALUMINUM

BACKGROUND OF THE INVENTION

The present invention relates to new rubber compositions intended for the manufacture of tires having a base of precipitated silicas "doped" with aluminum.

Since the saving of fuel and the necessity of protecting the environment has become a priority, it is desirable to produce polymers which have good mechanical properties and a hysteresis which is as slight as possible, so as to be able to employ them in the form of rubber compositions for the manufacture of various semifinished products which enter into the constitution of tires, such as, for instance, underlayers, calendering or sidewall rubbers or treads, and to obtain tires having improved properties, and in particular having reduced resistance to rolling.

In order to achieve this, numerous solutions have been proposed which consist, in particular, of modifying, inter alia, the nature of the diene polymers and copolymers at the end of polymerization by means of couplings or starring or functionalizing agents. All of these solutions are concentrated essentially on the use of polymers modified with carbon black as reinforcing filler in order to obtain good interaction between the modified polymer and the carbon black. It is known, in general, that in order to obtain the optimal reinforcing properties conferred by a filler, it is advisable that the filler be present in the elastomer matrix in a final form which is both as finely divided as possible and distributed as uniformly as possible. Now, such conditions can be realized only to the extent that, on the one hand, the filler has very good ability to incorporate itself in the matrix upon the mixing with the elastomer and of disaggregating or disagglomerating, and dispersing itself uniformly in the elastomer. The use of white reinforcing fillers, in particular silica, has proven unsuitable due to the poor level of certain properties of such compositions, and therefore of certain properties of the tires using these compositions.

Furthermore, for reasons of reciprocal affinities, the silica particles have a troublesome tendency within the elastomer matrix of agglomerating with each other. These silica—silica interactions have the harmful consequence of limiting the reinforcing properties to a level substantially less than that which it would be theoretically possible to obtain if all the silica/elastomer interactions capable of being created during of the mixing operation were actually obtained.

Furthermore, the use of silica raises difficulties in working due to silica/silica interaction which tend, in raw state, to increase the consistency of the rubber compositions and in any event to make the working more difficult than the working of carbon black.

The interest in silica reinforced compositions has been revived recently by the publication of European Patent Application EP-A-0 501 227 which discloses a sulfur-vulcanizable rubber composition obtained by thermo-mechanical working of a conjugated diene copolymer and an aromatic vinyl compound prepared by solution polymerization with 30 to 150 parts by weight to 100 parts by weight of elastomer of a special precipitated silica. The use of such a silica has, to be sure, reduced the difficulties of working mixtures containing it, as majority ingregient or not, as reinforcing filler, but the working of such rubber compositions remains nevertheless more difficult than the working of carbon black.

It is known to the person skilled in the art to necessarily use a coupling agent which reacts with the silica in order to create good interactions between the surface of the silica and the elastomer and a true network between the elastomer chains, while facilitating the dispersion of the silica, and the compounds described in European Patent Application EP-A-0 501 227 are also subject to this necessity. This coupling agent is very expensive and must be used in a relatively large amount. For a long time, means have been sought for decreasing the amount of coupling agent necessary in silica reinforced rubber compositions without degrading the properties of the compositions.

SUMMARY OF THE INVENTION

The object of the present invention is, on the one hand, to improve the working of the diene rubber compositions intended for the manufacture of tires and, on the other hand, to reduce the amount of coupling agent required without degrading the properties of such compositions.

The applicant has surprisingly discovered that each of the above two problems can be solved by the use in diene rubber compositions of an aluminum "doped" silica as reinforcing filler.

By aluminum "doped" silica there is understood a silica containing aluminum within the cell of its peripheral layers and/or fixed to the surface of the silica.

The object of the present invention is a sulfur-vulcanizable rubber composition intended for the manufacture of tires, which has as base at least one diene polymer, characterized by the fact that it contains, as reinforcing filler, a precipitated silica having an aluminum content of at least 0.35% by weight with reference to the weight of the silica.

Another object of the present invention is to obtain semifinished components which can be used in the manufacture of tires, in particular treads, as well as tires having improved resistance to rolling obtained by the use of a rubber composition in accordance with the invention which contains aluminum "doped" silica as reinforcing filler.

Still another object of the invention is a method of improving the hysteresis properties of diene rubber compositions intended for the manufacture of tires and of semifinished products for tires.

Finally, an object of the present invention is a method which makes it possible to reduce the amount of coupling agent necessary with reference to the weight of the silica employed in a diene rubber composition intended for the manufacture of tires and semifinished products for tires.

As aluminum "doped" silica which can be used in the invention there are suitable all precipitated silicas known to the person skilled in the art which have a BET surface area of $\leq 450$ m$^2$/g, and a CTAB specific surface area of $\leq 450$ m$^2$/g, even though this improvement is more pronounced with a highly dispersible precipitated silica.

By highly dispersible silica there is understood any silica having the capability of disagglomeration and dispersion in a very large polymeric matrix, as can be observed by electronic or optical microscopy, in thin sections. The dispersability of the silica is also evaluated by means of an ultrasonic disagglomeration aptitude test followed by a measurement, by diffraction, on a granulometer of the size of the silica particles in order to determine the median diameter (D50) of the particles and the disagglomeration factor (Fd) after disagglomeration, as described in European Patent Application EP-A-0 520 862, the content of which is incorporated herein, or as described in the article published in the journal "Rubber World" of June, 1994, pages 20–24, entitled "Dispersibility measurements of prec. silicas".

As non-limitative examples of such preferred highly dispersible silicas, mention may be made of those having a CTAB surface area equal to or less than 450 m$^2$/g and in particular those described in European patent applications EP-A-0 157 703 and EP-A-0 520 862, the content of which is incorporated herein, or the Perkasil KS 430 silica of the Akzo Company, the Zeosil 1165 MP silica of Rhône-Poulenc, or the Hi-Sil 2000 silica of the PPG Company.

However, there are more particularly preferred silicas having:

- a CTAB specific surface area of between 140 and 200 m$^2$/g, and preferably between 145 and 180 m$^2$/g,
- a BET specific surface area of between 140 and 200 m$^2$/g, and preferably between 150 and 190 m$^2$/g,
- a DOP oil absorption of less than 300 ml/100 g, and preferably between 200 and 295 ml/100 g,
- a median diameter ($\phi_{50}$), after ultrasonic disagglomeration, equal to or less than 3 μm, and preferably less than 2.8 μm, for instance less than 2.5 μm,
- an ultrasonic disagglomeration factor ($F_D$) of more than 10 ml, and preferably more than 11 ml, and more preferably $\geq 21$ ml,
- an aluminum content of at least 0.35% by weight referenced to the weight of the silica, and preferably at least 0.45% by weight and possibly up to 3% by weight referenced to the weight of the silica, and more particularly an aluminum content of between 0.50 and 1.50% by weight; this content may in particular be between 0.75 and 1.40% by weight,
- a ratio of BET specific area to CTAB specific area of $\geq 1.0$ and $\leq 1.2$.

When the aluminum content exceeds 3% by weight, a denaturing of the surface of the silica is observed which reduces the interest in using such a silica as reinforcing filler. When the aluminum content is less than 0.35% by weight, the properties of the diene rubber compositions are very close to those obtained with a precipitated silica in accordance with the prior art, that is to say non-aluminum "doped".

Of course, by silica there are also understood mixtures of different silicas. The silica may be used alone or in the presence of other white fillers. The CTAB specific surface area is determined by NFT method 45007 of November 1987. The BET specific surface area is determined by the method of BRUNAUER, EMMET and TELLER described in The Journal of the American Chemical Society, Vol. 80, page 309 (1938), corresponding to NFT Standard 45007 of November 1987. The DOP oil absorption is determined in accordance with NFT Standard 30-022 (March 1953) using dioctylphthalate.

These silicas "doped" with aluminum are obtained by a method of preparation which comprises the reacting of a silica with an acidifying agent whereby there is obtained a suspension of precipitated silica followed by separation and the drying of this suspension, in which the precipitation is effected in the following manner:

(i) An initial bottom product is formed containing a silicate and an electrolyte, the concentration of silicate (expressed as SiO$_2$) in said initial bottom product being less than 100 g/l and the electrolyte concentration in said initial bottom product being less than 17 g/l, (ii) the acidifying agent is added to said bottom product until obtaining a pH of the reaction medium of at least about 7, (iii) acidifying agent and a silicate are added at the same time to the reaction medium, and in which a suspension having a concentration of dry solids of at most 24% by weight is dried, said process comprising one of the following two operations (a) or (b):

(a) After step (iii), there is added to the reaction medium at least one compound A of aluminum and then a basic agent, said separation comprising a filtration and a disintegration of the cake resulting from said filtration, the disintegration being preferably effected in the presence of at least one compound B of aluminum.

(b) After step (iii), a silicate and at least one compound A of aluminum are added simultaneously to the reaction medium, and, when said separation comprises a filtration and a disintegration of the cake resulting from said filtration, the disintegration is preferably effected in the presence of at least one compound B of aluminum.

The choice of the acidifying agent and of the silicate is effected in a manner known per se.

It may be pointed out that as acidifying agent there is generally used a strong inorganic acid such as sulfuric acid, nitric acid or hydrochloric acid, or an organic acid such as acetic acid, formic acid or carbonic acid.

The acidifying agent may be dilute or concentrated; its normality may be between 0.4 and 36N, for instance between 0.6 and 1.5N.

In particular, in the event that the acidifying agent is sulfuric acid, its concentration may be between 40 and 180 g/l, for instance between 60 and 130 g/l.

One can furthermore employ as silicate any current form of silicate such as metasilicates, disilicates and, advantageously, an alkali-metal silicate, in particular sodium or potassium silicate.

The silicates may have a concentration, expressed as silica, of between 40 and 330 g/l, for instance between 60 and 300 g/l, and in particular between 60 and 250 g/l.

In general, sulfuric acid is used as acidifying agent and sodium silicate as silicate.

In the event that sodium silicate is used, it generally has a weight ratio of SiO$_2$/Na$_2$O of between 2 and 4, for instance between 3.0 and 3.7.

The precipitation is effected in a specific manner in accordance with the steps.

A bottom product is first of all formed, it containing silicate as well as an electrolyte (step (i)). The amount of silicate present in the initial bottom product advantageously represents only a part of the amount of silicate used in the reaction.

The expression electrolyte is understood here in its normal acceptance, that is to say it signifies any ionic or molecular substance which, when in solution, decomposes or dissociates to form ions or charged particles. The electrolyte may be a salt from the group of salts of alkali and alkali-earth metals, in particular the salt of the initial silicate metal and the acidifying agent, for instance sodium sulfate in the case of the reaction of a sodium silicate with sulfuric acid.

The concentration of electrolyte in the initial bottom product is greater than 0 g/l and less than 17 g/l, and preferably less than 14 g/l.

The concentration of silicate in the initial bottom product is greater than 0 g/l and less than 100 g of SiO$_2$ per liter. This concentration is preferably less than 90 g/l and in particular 85 g/l. In certain cases, it may be less than 80 g/l.

The second step consists in adding the acidifying agent to the bottom product of the composition described above (step (ii)).

This addition, which results in a correlative decrease in the pH of the reaction medium, is effected until reaching a value of the pH of at least about 7, and generally of between 7 and 8.

Once the desired pH has been reached, one effects a simultaneous addition (step (iii)) of acidifying agent and silicate.

This simultaneous addition is preferably carried out in such a manner that the value of the pH is at all times equal (within ±0.1) to that reached at the end of step (ii).

The method of preparing aluminum "doped" silica comprises one of the two operations A or B mentioned above, that is to say:

(a) after step (iii) there is added to the reaction medium at least one compound A of aluminum and then a basic agent, the separation employed in the process comprising a filtration and a disintegration of the cake resulting from said filtration, the disintegration being effected in the presence of at least one compound B of aluminum, or (b) after step (iii) a silicate and at least one compound A of aluminum are added simultaneously to the reaction medium and, when the separation used in the process comprises a filtration and a disintegration of the cake resulting from said filtration, the disintegration is preferably effected in the presence of at least one compound B of aluminum.

When the method of preparation comprises operation (a), the following successive steps are advantageously carried out after having effected the precipitation in accordance with steps (i), (ii), and (iii) described above:

(iv) at least one compound A of aluminum is added to the reaction medium (that is to say to the suspension or reaction slurry obtained), (v) a basic agent is added to the reaction medium, preferably until obtaining a value of the pH of the reaction medium of between 6.5 and 10, and in particular between 7.2 and 8.6, (vi) acidifying agent is added to the reaction medium, preferably until obtaining a value of the pH of the reaction medium of between 3 and 5, and in particular between 3.4 and 4.5.

It may then be advantageous, after the simultaneous addition of step (iii), to effect an aging of the reaction medium, which aging can, for instance, last for 1 to 60 minutes, and in particular from 3 to 30 minutes.

In this first variant, it is desirable to add an additional amount of acidifying agent to the reaction medium between step (iii) and step (iv), and in particular before said aging if any. This addition is effected generally until obtaining a value of the pH of the reaction medium of between 3 and 6.5, and in particular between 4 and 6.

The acidifying agent used upon this addition is generally identical to the one used in steps (ii), (iii) and (vi) of the first variant of the method of preparation in accordance with the invention.

An aging of the reaction medium is generally effected between step (v) and step (vi), for instance for 2 to 60 minutes, and in particular for 5 to 45 minutes.

Likewise, an aging of the reaction medium is generally effected after step (vi), for instance for 2 to 60 minutes, and in particular for 5 to 30 minutes.

The basic agent used in step (iv) may be an ammoniacal solution or preferably a solution of sodium hydroxide (or caustic soda).

When the method of separation comprises operation (b), then, after steps (i), (ii), and (iii) described above, there is carried out a step (iv) which consists in adding a silicate and at least one compound A of aluminum simultaneously to the reaction medium.

It may then be advantageous, after the simultaneous addition of step (iv), to effect an aging of the reaction medium, which aging can, for instance, last for 2 to 60 minutes and, in particular, for 5 to 30 minutes.

In this second variant, it is desirable, after step (iv) and in particular after said aging if any, to add an additional amount of acidifying agent to the reaction medium. This addition is generally effected until obtaining a value of the pH of the reaction medium of between 3 and 6.5, and in particular between 4 and 6.

The acidifying agent used upon this addition is generally identical to that used in steps (ii) and (iii) of the second variant of the method of preparation.

An aging of the reaction medium is generally effected after this addition of acidifying agent, for instance for 1 to 60 minutes, and in particular for 3 to 30 minutes.

The compound A of aluminum used in the method of preparation is generally an organic or inorganic salt of aluminum.

As examples of an organic salt, mention may be made, in particular, of the salts of carboxylic or polycarboxylic acids, such as the salts of acetic, citric, tartaric or oxalic acid.

As examples of inorganic salt, mention may be made, in particular, of the halides and oxyhalides (such as the chlorides and oxychlorides), nitrates, phosphates, sulfates, and oxysulfates.

In actual practice, the compound A of aluminum can be used in the form of a solution, generally an aqueous solution.

Preferably, an aluminum sulfate is used as compound A of aluminum.

The temperature of the reaction medium is generally between 70° and 98° C.

In accordance with a variant of the method, the reaction is carried out at a constant temperature of between 75° and 96° C.

In accordance with another variant (preferred) of the method, the temperature at the end of the reaction is higher than the temperature at the start of the reaction; thus, the temperature at the start of the reaction is maintained preferably between 70° and 96° C., whereupon the temperature is increased in a few minutes, preferably up to a value of between 80° and 98° C., at which value it is held until the end of the reaction; operations (a) and (b) are thus customarily carried out at this constant temperature value.

At the end of the steps which have just been described, a silica slurry is obtained, which is then separated (liquid-solid separation).

In the first variant of the method of preparation (that is to say, when the method comprises operation (a)), said separation comprises a filtration (followed by a washing if necessary) and a disintegration, said disintegration being effected in the presence of at least one compound B of aluminum and preferably in the presence of an acidifying agent such as described previously (in this latter case, the compound B of aluminum and the acidifying agent are advantageously added simultaneously).

The disintegration operation, which can be effected, for instance, by passing the filtration cake into a colloidal or ball crusher, makes it possible, in particular, to decrease the viscosity of the suspension which is to be dried subsequently.

In the second variant of the method of preparation of doped silica (that is to say when the method includes operation (b)), the separation also comprises, in general, a filtration (followed by a washing if necessary) and a disintegration, said disintegration being preferably effected in the presence of at least one compound B of aluminum and, in general, in the presence of an acidifying agent such as described previously (in this latter case, the compound B of aluminum and the acidifying agent are advantageously added simultaneously).

The compound B of aluminum is ordinarily different from the compound A of aluminum which has been previously mentioned and consists, in general, of an alkali-metal aluminate, in particular potassium or, preferably, sodium.

The amounts of compounds A and B of aluminum used in the method of preparing "doped" silica are preferably such that the precipitated silica prepared contains at least 0.35%, and in particular at least 0.45%, for instance between 0.50 and 1.50%, or even between 0.75 and 1.40%, by weight of aluminum with respect to the weight of silica.

The separation employed in the method of preparing aluminum "doped" silica customarily comprises a filtration effected by means of any suitable method, for instance by means of a belt filter, a rotary vacuum filter, or preferably a filter press.

The suspension of precipitated silica thus recovered (filtration cake) is then dried.

Immediately before drying, this suspension must have a concentration of dry solids of at most 24% by weight, and preferably at most 22% by weight.

This drying can be effected by any means known per se and the drying is preferably effected by spraying.

By diene polymers suitable for use in the compositions in accordance with the invention there is understood any homopolymer obtained by polymerization of a conjugated diene polymer having from 4 to 12 carbon atoms, any copolymer obtained by copolymerization of one or more conjugated dienes with each other or with one or more aromatic vinyl compounds having from 8 to 20 carbon atoms. As conjugated dienes there are suitable, in particular, butadiene-1,3, 2-methyl-1,3-butadiene, 2,3-di($C_1$ to $C_5$ alkyl)-1,3-butadiene, such as, for instance, 2,3-dimethyl-1, 3-butadiene, 2,3-diethyl-1,3-butadiene, 2-methyl-3-ethyl-1, 3-butadiene, 2-methyl-3-isopropyl-1,3-butadiene, phenyl-1, 3-butadiene, 1,3-pentadiene, 2,4-hexadiene, etc.

As aromatic vinyl compounds there are suitable, in particular, styrene, ortho, meta and para methylstyrene, the commercial mixture "vinyl-toluene", para-tertiobutylstyrene, the methoxy-styrenes, the chlorostyrenes, vinyl mesitylene, divinyl benzene, vinyl naphthalene, etc.

The copolymers may contain between 99% and 20% by weight of diene units and 1% to 80% by weight of aromatic vinyl units. The polymers may have any microstructure which is a function of the polymerization conditions used, in particular the presence or absence of a modifying and/or randomizing agent and of the amounts of modifying and/or randomizing agent used. The polymers may be block, statistical, sequenced, or microsequenced polymers, etc., and may be prepared in dispersion or in solution.

Polybutadienes are preferred, in particular those having a content of 1,2 units of between 4% and 80% and those having more than 90% of cis-1-4 bonds, polyisoprenes, copolymers of butadiene-styrene and in particular those having a styrene content of between 5% and 50% by weight, and more particularly between 20% and 40% by weight, a content of -1,2 bonds of the butadiene portion of between 4% and 65%, a content of trans-1,4 bonds of between 30% and 80%, those having a total content of aromatic compound of between 5% and 50% and a glass transition temperature (Tg) of between 0° C. and −80° C., and in particular those having a styrene content of between 25% and 30% by weight, a content of vinyl bonds of the butadiene portion of between 55% and 65%, a content of trans-1,4 bonds of between 20% and 25%, and a glass transition temperature of between −20° C. and −30° C.

In the case of butadiene-styrene-isoprene copolymers there are suitable ones having a styrene content of between 5 and 50%, and more particularly between 10% and 40%, an isoprene content of between 15% and 60% by weight and, more particularly, between 20% and 50% by weight, a butadiene content of between 5 and 50% and more particularly between 20% and 40% by weight, a content of 1,2 units of the butadiene portion of between 4% and 85%, a content of trans-1,4 units of the butadiene portion of between 6% and 80%, a content of 1,2 plus 3,4 units of the isoprene portion of between 5% and 70%, and a content of trans-1,4 units of the isoprene portion of between 10% and 50%.

Of course, the diene polymer may be coupled and/or starred or else functionalized with a coupling and/or starring or functionalizing agent. The diene polymer can also be natural rubber or a blend having a base of natural rubber.

The compositions in accordance with the invention contain, in addition to one or more diene polymers and silica, all or part of the other components and additives customarily employed in rubber mixes, such as plasticizers, pigments, antioxidants, sulfur, vulcanization accelerators, lengtheners, one or more coupling or silica bonding agents and/or one or more silica masking agents such as alkoxysilanes, polyols, amines, etc.

In a manner which could not be foreseen by the person skilled in the art, it has been discovered that the use of aluminum "doped" silica as reinforcing filler confers upon rubber compositions having a base of a synthetic and/or natural diene polymer improved working properties, in particular improved extrudability or suitability for use in an extruder, which makes these compositions particularly useful for the manufacture of semifinished products which can be employed as components of tires, in particular treads, underlayers, sidewall rubbers, and calendering rubbers.

Thus, the invention also has as its object a method of improving the hysteresis properties of sulfur vulcanizable diene rubber compositions intended for the manufacture of tires comprising silica as reinforcing filler, characterized by the fact that it consists in reinforcing said compositions with a precipitated silica having an aluminum content of between 0.35% and 3% (both inclusive) by weight, referred to the weight of the silica, and using it as known per se.

In a manner which was entirely unforeseeable for the person skilled in the art, it has been discovered that the use of aluminum "doped" silica as reinforcing filler makes it possible significantly to reduce the amount of coupling agent to be used in rubber compositions having a base of synthetic and/or natural diene polymers comprising a precipitated silica as reinforcing filler as compared with the amount of coupling agent necessary with the same precipitated but non-aluminum doped silicas, without penalizing the properties in vulcanized state of the compositions. In view of the high cost of coupling agents, the composition in accordance with the invention permits a substantial saving of money.

Another object of the invention is a method of reducing the content of coupling agent in sulfur-vulcanizable diene rubber compositions intended for the manufacture of tires comprising silica as reinforcing filler, characterized by the fact that it consists in using a precipitated silica having an aluminum content between 0.35% and 3% (both inclusive) by weight referred to the weight of the silica and using it as known per se.

In the method, there are used respective amounts of aluminum "doped" silica and coupling agent such that the ratio by weight of "doped" silica to coupling agent is between 4.5 and 8 (both inclusive) and preferably 5.5 and 6.7 (both inclusive).

The maximum beneficial effect is obtained when the aluminum doped silica constitutes all of the reinforcing filler. A beneficial effect is also obtained when the aluminum "doped" silica is used in majority or else when the aluminum "doped" silica is used blended with precipitated silicas of the prior art or with other white fillers or else with carbon black; as carbon blacks there are suitable all carbon blacks, in particular all the blacks commercially available or conventionally used in tires and, in particular, in the treads of tires. The amount of carbon black present may vary within wide limits, it being understood, however, that the improvement in the properties will be greater the greater the amount of silica present. The amount of carbon black present is preferably equal to or less than 33% of the amount of silica present in the composition.

The rubber composition of the invention is particularly suitable for the manufacture of tire treads intended in particular to equip passenger cars, 4×4 all-terrain light vehicles, minivans and motorcycles.

DESCRIPTION OF PREFERRED EMBODIMENTS

The invention is illustrated, but not limited, by the following examples, which do not constitute a limitation on the scope of the invention.

In the examples, the properties of the compositions are valued as follows:

Mooney viscosity ML (1+4) at 100° C. measured in accordance with ASTM Standard D-1646

Moduli of elongation at 300% (ME 300), 100% (ME 100): measurements carried out in accordance with ISO Standard 37

Scott indices of breakage: measured at 23° C. Rupture force (RF) in MPa Elongation upon rupture (ER) in %

Hysteresis losses (HL): measured by rebound at 23° C. and 60° C. in accordance with ISO Standard R17667 and expressed in %.

EXAMPLE 1

The object of this example is to compare two diene rubber compositions which are identical except for the silica used, which in the case of test 1 is an aluminum "doped" silica and in the case of test 2, which is the control test, is a silica in accordance with the prior art, that is to say a highly dispersible silica containing a reduced content of aluminum obtained by the process described in European Patent Application EP-A-0.520.862 and an amount of coupling agent which is less in test 1 than that used in test 2.

The characteristics of the components are as follows:

SBR solution: butadiene-styrene copolymer prepared in solution by the process described in French Patent Application No. 2 295 972, having a styrene content of 26%, a content of The polybutadiene (PB) is a polybutadiene having 93% cis-1,4 bonds, obtained by the process described in French Patent No. 1 436 607.

Antioxidant: N-(1,3-dimethylbutyl)-N'-phenyl-p-phenylenediamine.

Paraffin wax: mixture of macrocrystallin and microcrystallin waxes.

Sulfenamide: N-cyclohexyl-2-benzothiazyl sulfenamide.

Coupling agent: mixture, in a ratio of 1:1, of carbon black N 330 and polysulfur organosilane marketed by Degussa under the designation X50S.

Silica of test 2 in accordance with the prior art: BET 152 $m^2/g$; CTAB: 150 $m^2/g$; D50 in microns 5; Fd 8 ml; % total aluminum referred to the weight of the silica 0.25, marketed by Rhône-Poulenc under the trade name Z1165.

Aluminum "doped" silica: BET 178 $m^2/g$; CTAB 149 $m^2/g$; D50 in microns 2.7; Fd 17 ml; % total aluminum referred to the weight of silica 0.97.

Aromatic lengthening oil.

The aluminum "doped" silica is obtained by the method described below:

Into a stainless steel reactor provided with a propeller agitation system and heating by double jacket there are introduced:

350 liters of water 7.5 kg of $Na_2SO_4$ 580 liters of aqueous sodium silicate having an $SiO_2/Na_2O$ weight ratio of 3.45 and a density at 20° C. of 1.133.

The silicate concentration expressed as $SiO_2$ in the initial bottom product is then 84 g/l. The mixture is then brought to a temperature of 82° C., while maintaining it under agitation. There are then introduced into it 390 liters of dilute sulfuric acid of a density at 20° C. of 1.050 until obtaining a pH in the reaction medium (measured at its temperature) of 7.5. The temperature of the reaction is 82° C. during the first 25 minutes; it is then increased from 82° to 94° C. in about 15 minutes, and then held at 94° C. until the end of the reaction.

55 liters of aqueous sodium silicate of the type described above and 89 liters of sulfuric acid, also of the type described above, are then introduced simultaneously into the reaction medium, this simultaneous introduction of acid and silicate being effected in such a manner that the pH of the reaction medium is at all times equal to 7.5±0.1 during the period of introduction.

The introduction of acid is then stopped, and 86 liters of aqueous sodium silicate of the type described above and 33 liters of an aluminum sulfate solution of a density at 20° C. of 1.2 are then introduced jointly into the reaction medium during 24 minutes.

This joint introduction is then stopped and the reaction medium is aged for 10 minutes at 94° C.

Sulfuric acid of the type described above is then introduced into the reaction medium for 7 minutes in such a manner as to bring the pH of the reaction medium to a value of 5.0. After this introduction of acid, the reaction slurry obtained is maintained under agitation for 5 minutes.

The total reaction time is 109 minutes.

There is thus obtained a slurry of precipitated silica which is filtered and washed by means of a filter press.

The cake contained is then fluidized by simple mechanical action. After this disintegrating operation, the resultant slurry, of a pH equal to 6.5 and a fire loss equal to 78.3% (and therefore a dry solids concentration of 21.7% by weight) is sprayed by means of nozzle sprayer.

The silica obtained is in the form of substantially spherical balls.

The compositions of tests 1 and 2 are obtained by thermomechanical working in two steps in an internal mixer which last for 5 and 4 minutes with an average speed of the blades of 45 rpm, until reaching a maximum drop in temperature of 160° C. followed by a finishing step carried out at 65° C., of the components in the following formulation in which all parts are expressed by weight:

| Composition | Test 1 | Test 2 |
|---|---|---|
| SBR/PB | 75/25 | 75/25 |
| Silica |  | 80 |
| Doped silica | 80 |  |
| Aromatic oil | 37.5 | 37.5 |
| Coupling agent | 9.6 | 12.8 |
| Stearic acid | 1.0 | 1.0 |
| Anti-ozone wax | 1.5 | 1.5 |
| Zinc oxide | 2.5 | 2.5 |
| Antioxidant | 2.0 | 2.0 |
| Sulfur | 1.4 | 1.4 |
| Sulfenamide | 1.7 | 1.7 |
| Diphenyl guanidine | 2.7 | 2.0 |

The vulcanization is carried out at 150° C. for 40 minutes.

The properties of these two compositions are compared with each other in both unvulcanized state and vulcanized state.

The results are set forth in Table I.

TABLE I

| Composition | Test 1 | Test 2 |
|---|---|---|
| Conventional rubber properties | | |
| Mooney | 105 | 110 |
| Properties in vulcanized state | | |
| Shore Hardness A | 69.9 | 69.5 |
| ME 100 | 2.04 | 1.94 |
| ME 300 | 2.63 | 2.48 |
| ME 300/100 | 1.29 | 1.28 |
| Scott break index at: | | |
| RF at 23° C. | 19.7 | 20.3 |
| ER% at 23° C. | 500 | 526 |
| HL at 60° C.* | 25.0 | 25.8 |

*)The deformation for this hysteresis loss is 34%.

It is noted that composition 1 in accordance with the invention using the aluminum "doped" silica with a reduced amount of coupling agent, due to better dispersibility of the silica in the elastomer, retains a lower level of Mooney viscosity, which results in a greater ease of working the composition both at the level of the thermo-mechanical masticating work and at the level of the extrusion or calendering operations, in particular upon the production of semifinished products. This composition also has an improved filler-elastomer interaction index as evidenced by the ratio of the 300 modulus to the 100 modulus, while retaining substantially the same level of the mechanical properties. This composition furthermore has an improvement in the hysteresis loss and therefore is suitable for entering into the constitution, in particular, of a tire tread capable of leading to a tire having reduced resistance to rolling.

EXAMPLE 2

In this example, three tests are carried out in order to compare three compositions. The composition used in test 3, which is a composition in accordance with the invention, contains an aluminum "doped" silica and a reduced amount of coupling agent. The composition used in test 4 contains a silica in accordance with the prior art and a content of conventional coupling agent in accordance with the prior art. The composition used in test 5 differs mainly from the composition of test 4 only by a reduced content of coupling agent identical to that used in test 3.

The formulation used for these three tests is as follows:

|  | Tests 3 and 5 | Test 4 |
|---|---|---|
| SBR solution: 100 | | |
| Silica: 70 | | |
| Aromatic oil: 37.5 | | |
| Coupling agent | 8.4 | 11.2 |
| Stearic acid: 1.5 | | |
| Anti-ozone wax: 1.5 | | |
| Zinc oxide: 2.5 | | |
| Antioxidant: 1.9 | | |
| Sulfur | 1.44 | 1.10 |
| Sulfenamide | 2.60 | 2.0 |
| Diphenyl guanidine: 1.50 | | |

All the components are identical to those used in Example 1 with the exception of the silica, and the use of the components is effected in the same manner as that described in Example 1.

In test 3, which is in accordance with the invention, there is used an aluminum "doped" silica having a CTAB specific surface are of 151 $m^2/g$, a BET specific surface area of 169 $m^2/g$, a D50 of 2.7 microns, an Fd of 17 ml and a surface total aluminum rate of 0.77%, which was prepared by the method described in the specification. In tests 4 and 5, the silica is the same precipitated silica in accordance with the prior art as that used in test 2 of Example 1.

The vulcanization is effected at 150° C. for 40 minutes. The properties of these two compositions are compared with each other, both in unvulcanized state and in vulcanized state. The results are set forth in Table II.

TABLE II

| Composition | Test 3 | Test 4 | Test 5 |
|---|---|---|---|
| Conventional rubber properties | | | |
| Mooney | 75 | 73 | 81 |
| Properties in vulcanized state | | | |
| Shore Hardness A | 65.7 | 65.6 | 65.2 |
| ME 100 | 1.81 | 1.61 | 1.67 |
| ME 300 | 2.16 | 1.88 | 1.91 |
| ME 300/100 | 1.20 | 1.17 | 1.15 |
| Scott break index at: | | | |
| RF at 23° C. | 21.8 | 21.7 | 22.1 |
| ER 14 23° C. | 566 | 604 | 612 |
| HL at 23° C. | 41.1 | 43.9 | 43.3 |
| HL at 60° C. | 26.8 | 30.6 | 29.8 |

The results show that the composition of the invention, while having a reduced content of coupling agent, has a level of viscosity close to that of the control of test 4, while in the case of the control composition 5, the viscosity is substantially increased, which is shown by a hardening of the raw mixture and the more difficult working.

It is also noted that the elastomer-silica interactions and the hysteresis properties of composition 3 in accordance with the invention are definitely better than those exhibited by the control compositions 4 and 5, and this even though the amount of coupling agent is reduced. Furthermore, all the other properties have substantially been retained.

EXAMPLE 3

In this example, the properties of a composition in accordance with the invention using an aluminum "doped" silica and having a conventional amount of coupling agent referred to the amount of silica in accordance with the prior art (Test 6) are compared with those of a control composition using the same silica as that used in test 2 of Example 1 (Test 7).

The aluminum "doped" silica used in test 6 has a CTAB specific surface area of 149 m²/g, a BET specific surface area of 149 m²/g, a D50 of 2.1 microns, an Fd of 36 ml, and a total surface aluminum amount of 0.85% by weight referred to the weight of the silica.

The formulation for the two compositions is identical to that of test 4 of Example 2 and is carried out in the same manner as that described in Example 1.

The vulcanization is effected at 150° C. for 40 minutes.

The results are set forth in Table III.

TABLE III

| Composition | Test 6 | Test 7 |
|---|---|---|
| Conventional rubber properties | | |
| Mooney | 70 | 85 |
| Properties in vulcanized state | | |
| Shore Hardness A | 66.2 | 68.0 |
| ME 100 | 1.58 | 1.66 |
| ME 300 | 3.61 | 3.50 |
| ME 300/100 | 1.14 | 1.05 |
| Scott break index at: | | |
| RF at 23° C. | 21.2 | 23 |
| ER 14 23° C. | 696 | 757 |
| HL at 23° C. | 40.8 | 43.1 |
| HL at 60° C. | 27.5 | 29.7 |

The results make it possible to note that the composition in accordance with the invention, when it has an amount of coupling agent in accordance with the prior art, has working properties and hysteresis properties which are definitely improved, as well as a better elastomer-silica interaction. The composition in accordance with the invention is thus capable of permitting easier manufacture, and therefore more economical manufacture, of semifinished products intended for tires and of tires, in the sense that the use of the composition is close to that employing carbon black. The composition in accordance with the invention, due to its excellent hysteresis properties, is also suitable for forming tires having reduced resistance to rolling.

I claim:

1. A sulfur vulcanizable rubber composition intended for the manufacture of tires, having a base of at least one diene polymer, characterized by the fact that it contains as reinforcing filler, a precipitated silica having an aluminum content of between 0.35% and 3% by weight (both inclusive), referred to the weight of the silica, prepared by reacting silicate with an acidifying agent to obtain a suspension of precipitated silica, performing a step selected from the group consisting of:

(a) adding at least one compound A of aluminum and then a basic agent; and (b) adding a silicate and at least one compound A of aluminum simultaneously;

and then separating the resulting suspension by filtration to provide a cake.

2. A composition according to claim 1, characterized by the fact that the aluminum content of the silica is at least 0.45% by weight referenced to the weight of the silica.

3. A composition according to claim 2, characterized by the fact that the aluminum content of the silica is between 0.50% and 1.50% by weight (both inclusive), and preferably between 0.75 and 1.40% by weight (both inclusive), referenced to the weight of the silica.

4. A composition according to claim 1, characterized by the fact that the silica has a CTAB specific surface area less than or equal to 450 m²/g, and a BET specific surface area between 100 m²/g and 300 m²/g (both inclusive).

5. A composition according to claim 4, characterized by the fact that the silica has a ratio between BET specific surface area and CTAB specific surface area of between 1 and 1.2 (both inclusive).

6. A composition according to claim 1, characterized by the fact that the diene polymer is a butadiene-styrene copolymer or a butadiene-styrene-isoprene copolymer.

7. A composition according to claim 6, characterized by the fact that the butadiene-styrene copolymer is a copolymer prepared in solution having a styrene content of between 25 and 30% by weight, a content of vinyl bonds of the butadiene portion of between 55% and 65%, a content of trans-1,4 bonds of between 20% and 25%, and a glass transition temperature of between −20° C. and −80° C.

8. A composition according to claim 7, characterized by the fact that it furthermore contains polybutadiene and/or natural rubber and/or polyisoprene.

9. A composition according to claim 8, characterized by the fact that the polybutadiene contains more than 90% of cis-1,4 bonds.

10. A method of improving the hysteresis properties of sulfur vulcanizable diene rubber compositions which are intended for the manufacture of tires comprising silica as reinforcing filler, characterized by the fact that it consists in reinforcing the compositions with a precipitated silica having an aluminum content of between 0.35% and 3% by weight (both inclusive), referenced to the weight of the silica, and in using it in the manner known per se, prepared by reacting silicate with an acidifying agent to obtain a suspension of precipitated silica, performing a step selected from the group consisting of:

(a) adding at least one compound A of aluminum and then a basic agent; and (b) adding a silicate and at least one compound A of aluminum simultaneously;

and subsequently separating the resulting suspension by filtration to provide a cake.

11. A method of reducing the content of coupling agent in sulfur vulcanizable diene rubber compositions intended for the manufacture of tires comprising silica as reinforcing filler, characterized by the fact that it consists in using a precipitated silica having an aluminum content of between 0.35% and 3% by weight (both inclusive), referenced to the weight of the silica and in using it as known per se, wherein the precipitated silica is prepared by reacting silicate with an acidifying agent to obtain a suspension of precipitated silica, performing a step selected from the group consisting of:

(a) adding at least one compound A of aluminum and then a basic agent; and (b) adding a silicate and at least one compound A of aluminum simultaneously;

and subsequently separating the resulting suspension by filtration to provide a cake.

12. A method according to claim 11, characterized by the fact that the ratio by weight of aluminum "doped" silica to coupling agent is equal to or greater than 4.5 and less than 8.

13. A method according to claim 12, characterized by the fact that the ratio by weight of aluminum "doped" silica to coupling agent is between 5.5 and 6.7 (both inclusive).

14. A tire comprising a sulfur vulcanizable diene rubber composition, comprising silica as reinforcing filler, characterized by the fact that the silica is a precipitated silica having an aluminum content of between 0.35% and 3% by weight (both inclusive), referenced to the weight of the silica, prepared by reacting silicate with an acidifying agent to obtain a suspension of precipitated silica, performing a step selected from the group consisting of:

(a) adding at least one compound A of aluminum and then a basic agent; and (b) adding a silicate and at least one compound A of aluminum simultaneously;

and subsequently separating the resulting suspension by filtration to provide a cake.

15. A tire according to claim 14, characterized by the fact that the tread comprises a precipitated silica having an aluminum content of between 0.35% and 3% by weight (both inclusive), referenced to the weight of the silica.

16. A tire tread having a base of a sulfur vulcanizable diene rubber composition comprising silica as reinforcing filler, characterized by the fact that the silica is a precipitated silica having an aluminum content of between 0.35% and 3% by weight (both inclusive), referenced to the weight of the silica, prepared by reacting silicate with an acidifying agent to obtain a suspension of precipitated silica, performing a step selected from the group consisting of:

(a) adding at least one compound A of aluminum and then a basic agent; and (b) adding a silicate and at least one compound A of aluminum simultaneously;

and subsequently separating the resulting suspension by filtration to provide a cake.

17. A composition according to claim 1, wherein the percentage by weight of coupling agent, not including carbon black, to "doped" silica is less than the value of the percentage by weight of coupling agent to a silica having an aluminum content of between 0% and 0.30% by weight referenced to the total weight of silica.

18. A composition according to claim 17, wherein the percentage by weight of coupling agent, not including carbon black, to aluminum "doped" silica is equal to or greater than 4.5 and less than 8.

19. A composition according to claim 18, wherein the percentage by weight of coupling agent, not including carbon black, to aluminum "doped" silica is between 5.5 and 6.7 (both inclusive).

* * * * *